(12) United States Patent
Dixon et al.

(10) Patent No.: US 7,417,849 B2
(45) Date of Patent: Aug. 26, 2008

(54) ELECTRICAL COMPONENT FASTENER FOR A LOAD CENTER BASEPAN

(75) Inventors: Joseph Scott Dixon, Suwanee, GA (US); Kristopher Scott Robinson, Atlanta, GA (US); Jeffrey Kenton Hudgins, Jr., Gainesville, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 220 days.

(21) Appl. No.: 10/998,683

(22) Filed: Nov. 29, 2004

(65) Prior Publication Data
US 2006/0114647 A1 Jun. 1, 2006

(51) Int. Cl.
*G06F 1/16* (2006.01)
*H02B 1/04* (2006.01)

(52) U.S. Cl. .............. 361/634; 361/637; 361/645; 200/293; 200/294

(58) Field of Classification Search ........... 361/600, 361/608, 622, 648, 652, 657, 637, 650, 627, 361/634, 636, 639, 640, 658; 174/65 R, 174/149 B, 166 R, 70 B, 51; 24/108, 297, 24/17 AP, 16 PB; 248/222.11, 222.12, 220.2, 248/223.3, 224.4, 225.1; 220/3.8; 200/307
See application file for complete search history.

(56) References Cited

U.S. PATENT DOCUMENTS

| | | | | |
|---|---|---|---|---|
| 4,118,754 A | * | 10/1978 | Duggan | 361/637 |
| 5,337,211 A | * | 8/1994 | Reiner et al. | 361/637 |
| 5,640,294 A | | 6/1997 | Caggiano et al. | 361/637 |
| 6,160,698 A | | 12/2000 | Tumlin et al. | 361/627 |
| 6,266,232 B1 | * | 7/2001 | Rose et al. | 361/645 |

* cited by examiner

*Primary Examiner*—Michael Datskovskiy (57) ABSTRACT

An apparatus and method for an electric load center including a basepan with a plurality of fastener devices for securing bus bars, neutral bars, and a variety of other electrical components to the basepan. Each fastener device comprises two independent structures, the first structure a self aligning support post and the second structure is an engaging lock. Both the self aligning support post and the engaging lock project away from the basepan first surface. The self aligning support post consists of a plurality of angled surfaces to facilitate assembly of the electrical component to the basepan first surface. The self aligning support post also contains an interior cavity that houses the engaging lock. The engaging lock has a first surface with an inclined angle with respect to the basepan and a second surface with a zero angle with respect to the basepan to facilitate retention of the bus bar. The fastening device may also include a swing snap and an angled arm for securing electrical components to basepan first surface.

24 Claims, 7 Drawing Sheets

SECTION A-A

FIGURE 6b

SECTION A-A

ELECTRICAL COMPONENT FASTENER FOR A LOAD CENTER BASEPAN

BACKGROUND

A load center is an enclosure used in electrical systems of all types for both conventional homes and commercial buildings for holding overcurrent devices or circuit breakers. A load center is the central point of distribution and overcurrent protection of an electrical system which includes panel, breaker panel, breaker box, and main panel. For safety and convenience purposes, all overcurrent devices that protect structure wiring should be in a central location. Loads such as lights, electric motors, and appliances which consume electricity are the energy consuming devices in any electrical system. All of the wiring supplying the electrical loads in a building come together at individual breakers in the load center. The number of overcurrent devices in a load center is dictated by the total electrical consumption of the building and the type of load. A single breaker may protect many electrical receptacles.

An electric load center also generally consists of an insulated basepan on which several bus bars, neutral bars, neutral tie bars and other electrical components have been secured. Traditionally, electrical components have been secured to the basepan of a load center by using secondary hardware or common fastening devices such as screws and bolts. This can be cumbersome, time consuming to apply, uneconomical, require extra parts, and most importantly can impart stresses to the component being secured and adversely effect the structural integrity of the component. Similarly, heat staking or the plastic deformation of posts in a plastic basepan has also been employed to secure busbars to a basepan. The heat staking process requires a large amount of energy and time during the assembly process to achieve the desired amount of deformation. Similarly, the heat staking process imparts stresses which concentrate at the face of the basepan where the base of the post intersects the basepan to form corners. Such stress can significantly impair the integrity of the connection by causing a fracture of the post, loss of the integrity of the connection, and a decrease in the service life of the basepan and the load center. A need has therefore developed for an improved fastening device that will secure electrical components to a basepan.

Also, prior art attachment methods between the neutral bar and the basepan are unsatisfactory. There is a need for simplified assembly, mounting and securing of the neutral bar to the basepan. This is accomplished by providing a configuration of the neutral bar for which the neutral bar is attached by means of applying a downward vertical force to fix the neutral bar to the supporting basepan and does not require the use of screws or heat staking thereby reducing the number of components in the load center and facilitating the mounting of the neutral bar to the basepan.

SUMMARY OF INVENTION

In accordance with the invention, a load center apparatus comprising an enclosure, a basepan mounted with the enclosure for distributing a load to a circuit breaker, a basepan first surface for securing electrical components with a fastener assembly wherein the fastener assembly comprises a self aligning support post and an engaging lock for securing the at least one electrical component to the basepan first surface.

In accordance with another aspect of the invention, a basepan for securing electrical components in a load center comprising a basepan first surface wherein at least one electrical component is secured after mounting; and fastener assembly comprising a self aligning support post and an engaging lock for securing the at least one electrical component to the basepan first surface.

In accordance with another aspect of the invention, a method to secure an electrical component to a basepan, the method comprising, mounting the electrical component to a basepan first surface; providing a fastening assembly having a self aligning support post and an engaging lock; and securing the electrical component with the fastening assembly.

In accordance with another aspect of the invention, a load center comprising: an enclosure, a basepan mounted with the enclosure for distributing a load to a circuit breaker, a basepan first surface for securing electrical components with a fastener assembly wherein the fastener assembly comprising an angled arm and a swing snap for securing the at least one electrical component to a basepan first surface.

It is an object of the invention to secure electrical components to an insulated surface in a load center without the use of secondary hardware and equipment such as, heat staking equipment, push nut insertion equipment or a mechanical press.

It is an object of the invention to reduce the amount of force required to assemble an electrical component the insulated surface of a load center.

DETAILED DESCRIPTION

Referring to FIGS. 1a-1d, the load center 10 includes an enclosure 20, ground lug 30, supporting basepan 40 mounted therein, door 50, door latch 60, bus bars 70, neutral bars 80, neutral tie bar 90, the main lug (not shown) and neutral lug 110, main lug insulator 120 and distribution circuit breakers 130. In the present invention, the bus bar 70 dimensions will be specified by customer requirements prior to load center 10 assembly.

The basepan 40 includes a first surface 140 upon which an electrical component such as a bus bar 70 can be mounted to distribute electric power from an incoming utility power line to a plurality of individual circuits through circuit breakers 130. The bus bar 70 is secured to the basepan 40 by a fastening assembly 150.

Referring to FIGS. 2-5, the fastening assembly 150 utilizes a dual and independent structure including at least one engaging lock 160 and a self aligning support post 170. The self aligning support post 170 projects perpendicularly from the basepan 40 and consists of a multifaceted surfaces 180 that function to prevent lateral motion of any electrical components being secured to the basepan first surface 140 of the load center 10. The self aligning support post 170 also contains a plurality of outwardly angled surfaces 210 that facilitates the vertical assembly of load center 10 and similarly prevent any lateral motion of an electrical component being secured to the basepan first surface 140. The outwardly angled surfaces 210 are configured to located the bus bar or other electrical component with respect to the basepan 40. Self aligning support post 170 also includes two side extending walls 230 that create an interior cavity 220 of the self aligning support post 170.

Once the bus bar 70 comes into contact with the engaging lock 160, the first surface 190 of the engaging lock 160 will initially elastically bend and flex towards the support post 170. The distance between the engaging lock second surface 200 and the basepan first surface 140 will be dictated and predetermined by the thickness of the electronic component being mounted. The distance between the second surface 200 and the bus bar 70 will be a varying optimized gap that may approach zero. The distance of the engaging lock 160 from basepan first surface 140 will be predetermined based on several factors including the material thickness of bus bar 70 and current process capability of producing the bus bar 70.

The engaging lock 160 and the self aligning support post 170 are in close proximity however do not contact each other. After complete mounting of the electrical component or bus bar 70 to the basepan 40, the engaging lock 160 will prevent any vertical movement of the bus bar 70. Similarly the engaging lock 160 consists of a first surface 190 inclined towards the basepan 40 at a non zero angle. The engaging lock 160 also consists of a second surface 200 having a zero angle with respect to the basepan 40. The engaging lock 160 serves as an engaging hook to secure the electrical components to the basepan first surface 140. The engaging lock 160 also projects away from the basepan first surface 140 and its support stand 165 sits within the interior cavity 220 of the self aligning support post 170 where the bottom post of the engaging lock 160 is aligned with the bottom post of the self aligning support post 170. The engaging lock support stand 165 provides both support to the engaging lock 160 and flexes upon application of the bus bar 70. The engaging lock support stand 165 resides within the side extending walls 230. Although the preferred embodiment uses one engaging lock 160 in the construction of the fastener assembly 150, others skilled in the art may select more than one engaging lock 160.

Fastener assembly 150 operates by applying a downward force that is perpendicular to the basepan first surface 140 until the self aligning support post 170 engages and prevents the bus bar 70 from moving. The self aligning support post 170 prepositions the bus bar 70 just before a downward force is applied by a press or manual assembly. The self aligning support post 170 then guides the bus bar 70 as it is being mounted to the basepan first surface 140. The self aligning support post 170 is sized so that there will be interference between the bus bar 70 and the self aligning support post 170. This will eliminate lateral movement of the bus bar 70 once assembly has been completed. A downward force perpendicular to the basepan first surface 140 will trigger movement to the engaging lock 160. The engaging lock 160 and support stand 165 both projecting away from the basepan first surface 140 will initially move toward the support post 170 and away from the middle plane perpendicular to the basepan first surface 140 returning back to its initial position once the bus bar 70 has been inserted. As a result, the engaging lock 160 will not be in a pre-loaded state in order to hold the bus bar 70 in place (in a direction perpendicular to the basepan first surface 140). The engaging lock 160 will only be under load if a force opposite the downward force is applied to the bus bar 70. However, the engaging lock 160 will prevent the bus bar 70 from disengaging. The amount of force required to release the bus bar 70 will be dependent on the type of material selected. Preferably, a material achieving no less than a 35 lb or 50 lb pull out force to disengage the bus bar 70 is used.

Figure 1A:
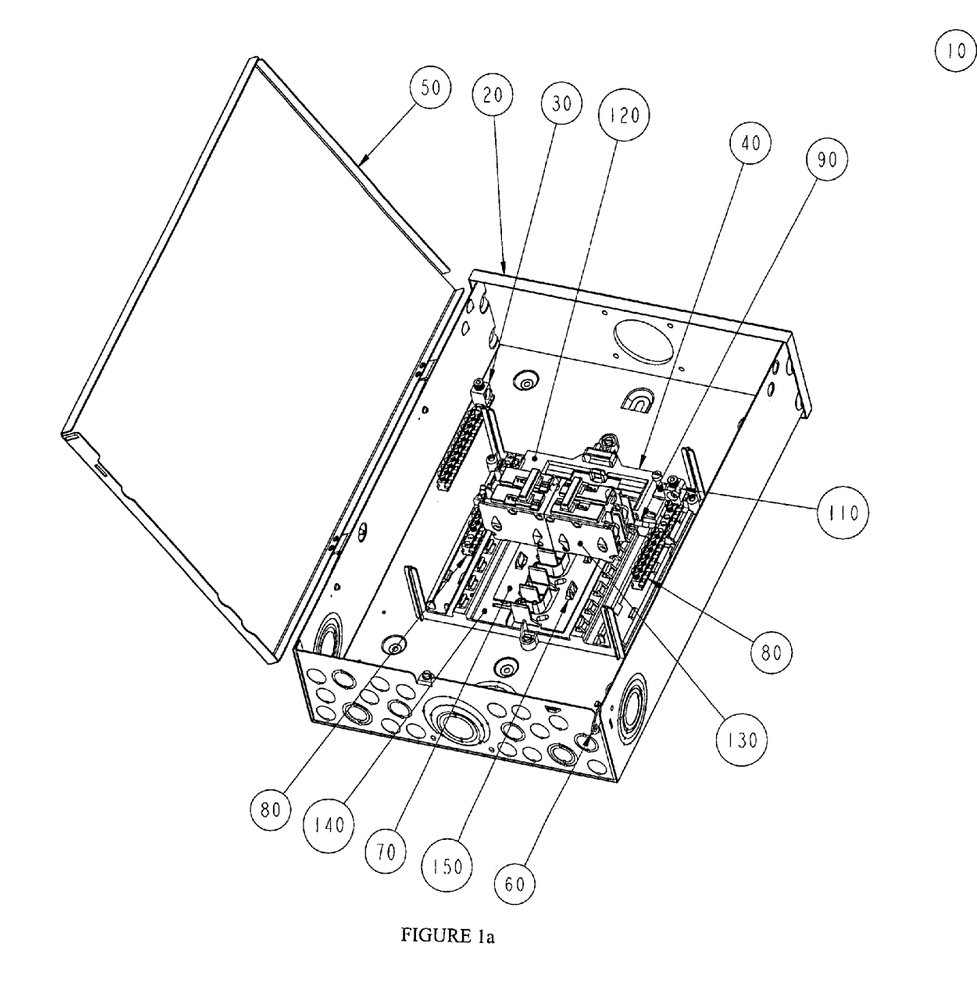
FIG. 1a shows an electrical component fastener in the basepan of the load center.
Figures 1B, 1C, 1D:
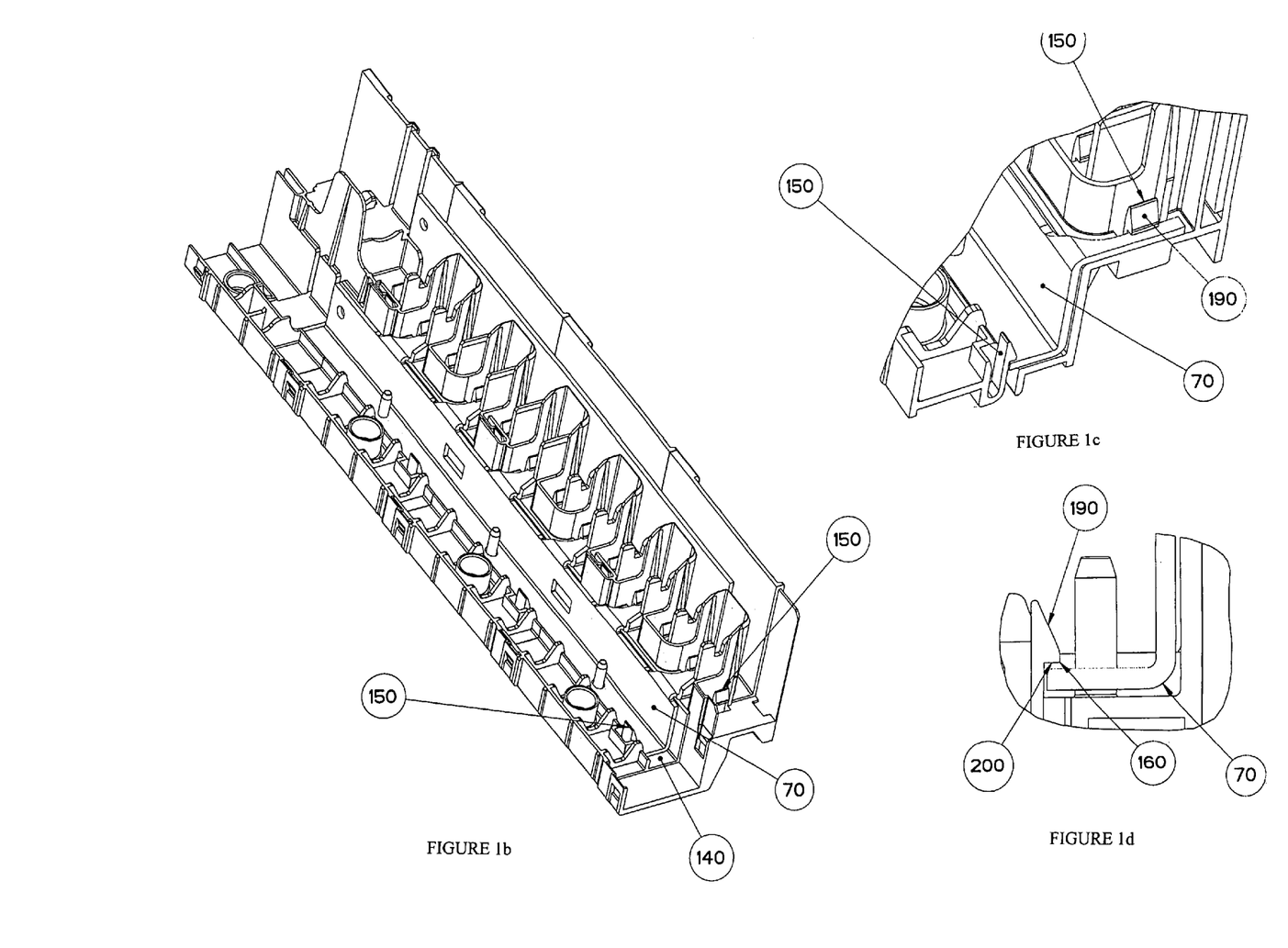
FIG. 1b shows a magnified view of the fastener in the basepan of the load center.
FIG. 1c shows a magnified view of the fastener securing a bus bar.
FIG. 1d shows a magnified side view of the fastener securing a bus bar.
Figure 2:
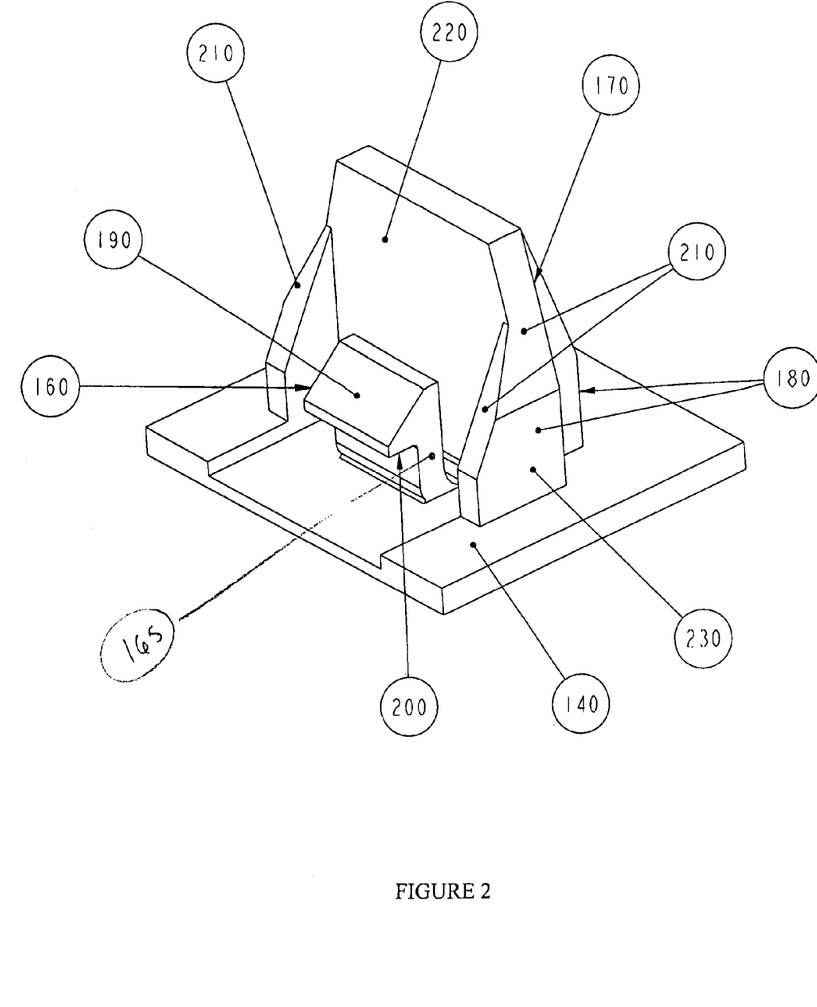
FIG. 2 shows a perspective view of the fastener for the present invention.
Figure 3:
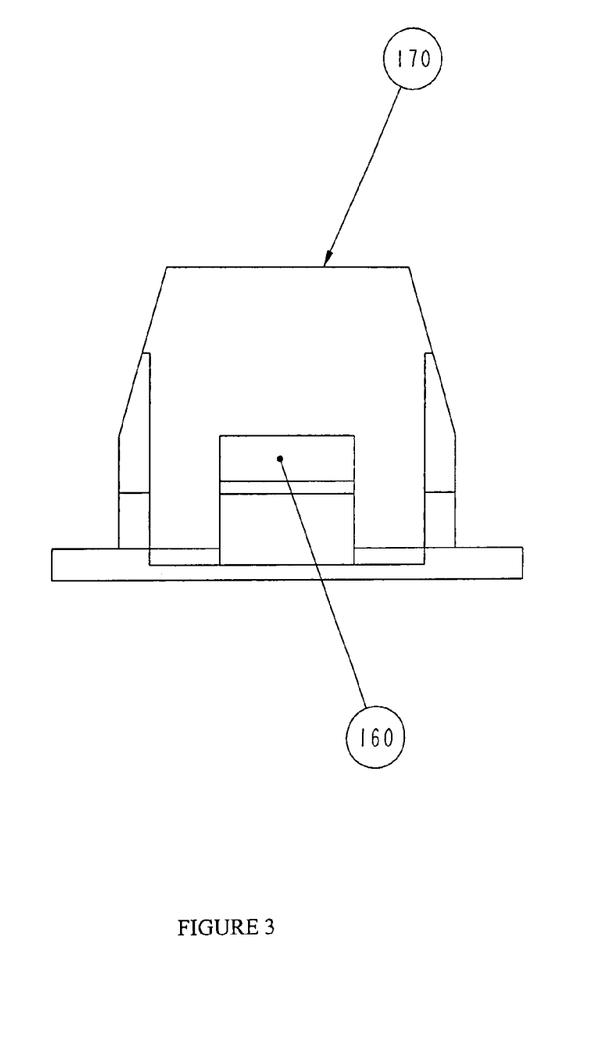
FIG. 3 shows a frontal view of the fastener for the present invention.
Figure 4:
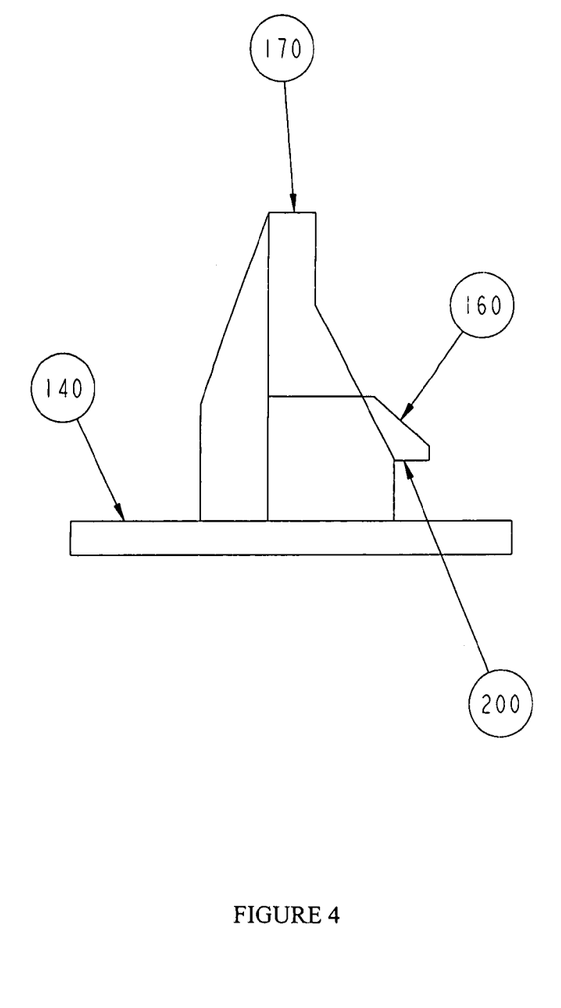
FIG. 4 shows a cross sectional view of the fastener for the present invention.
Figure 5:
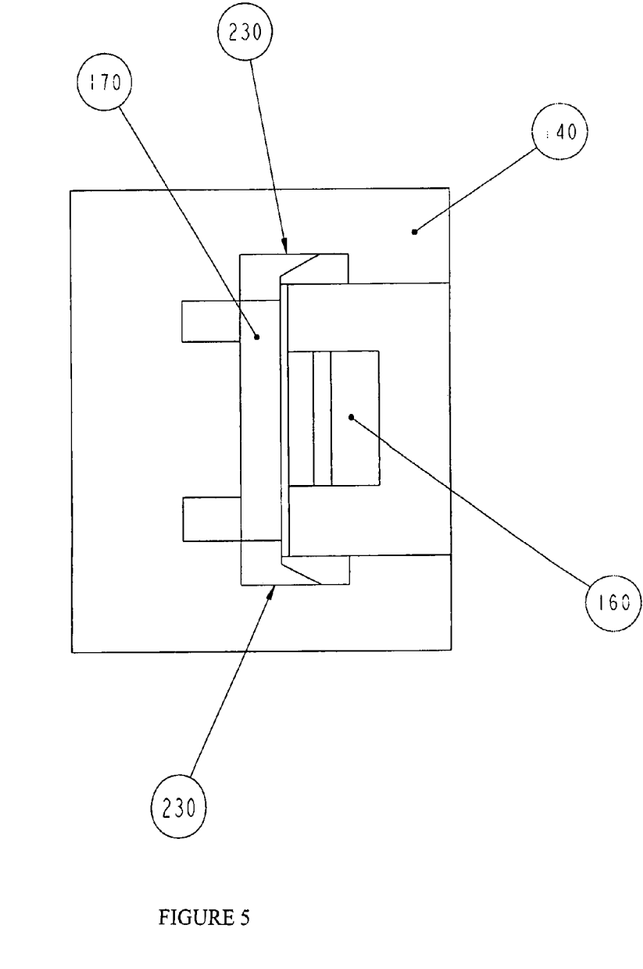
FIG. 5 shows an elevational view of the fastener for the present invention.
Figure 6A:
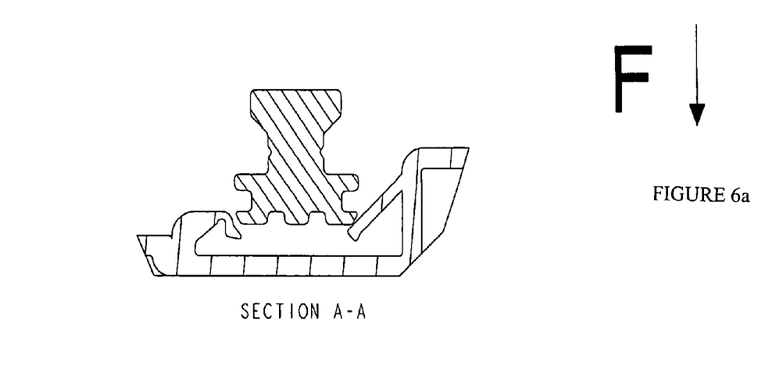
FIG. 6a shows a cross sectional A-A view of a neutral bar being installed into a basepan in a load center.
Figure 6B:
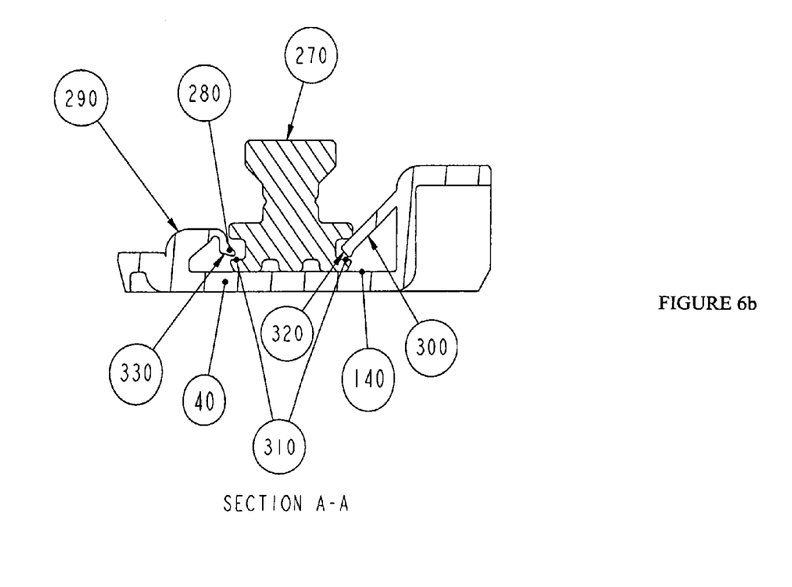
FIG. 6b shows a cross section view of the fastener with the neutral bar.

Referring to FIGS. 6a and 6b, installation of the neutral bar 270 within the basepan 40 is accomplished by applying a downward vertical force (F) to the neutral bar 270 thereby engaging neutral bar 270 with swing snap 280 of wall 290 and an angled arm 300 until neural bar extension 310 positions and locks itself under both the swing snap 280 and angled arm 300. The first surface 320 of angled arm 300 and the first surface 330 of swing snap 280 have a non zero angle with respect to the first surface of basepan 140. Swing snap 280 and angled arm 300 will interfere with any vertical motion of neutral bar 270 and will function to secure neutral bar 270 to basepan 40.

While the foregoing description and drawings represent the preferred embodiments of the present invention, it will be apparent to those skilled in the art that various changes and modifications may be made therein without departing from the true spirit and scope of the present invention.

The invention claimed is:

1. A load center apparatus comprising an enclosure, a basepan mounted with the enclosure for distributing a load to a circuit breaker, a basepan first surface for securing electrical components with a top down fastener assembly wherein the top down fastener assembly comprises a self aligning support post and an engaging lock for securing the at least one electrical component to the basepan first surface.

2. The apparatus according to claim 1, wherein the self aligning support post includes a plurality of non zero angled faces to facilitate assembly of the at least one electrical component.

3. The apparatus according to claim 1, wherein the self aligning support post includes an interior cavity to house the engaging lock.

4. The apparatus according to claim 1, wherein the engaging lock comprises at least a first and a second surface.

5. The engaging lock according to claim 4, wherein the first surface is inclined at a non-zero degree angle with respect to the basepan first surface.

6. The engaging lock according to claim 4, wherein the second surface is angled at zero degrees with respect to the basepan first surface.

7. The engaging lock according to claim 4, further comprising a support stand.

8. The apparatus according to claim 1, wherein a bottom post of the engaging lock is aligned with a bottom post of the self aligning support post.

9. A basepan for securing electrical components in a load center comprising
   a basepan first surface wherein at least one electrical component is secured after mounting; and
   a top down fastener assembly comprising a self aligning support post and an engaging lock for securing the at least one electrical component to the basepan first surface.

10. The basepan apparatus according to claim 9, wherein the self aligning support post includes a plurality of non zero angled faces to facilitate assembly of the electrical component.

11. The basepan apparatus according to claim 9, wherein the self aligning support post includes an interior cavity to house the engaging lock.

12. The basepan apparatus according to claim 9, wherein the engaging lock comprises at least a first and a second surface.

13. The engaging lock according to claim 12, wherein the first surface is inclined at a non-zero angle with respect to the basepan first surface.

14. The engaging lock according to claim 12, wherein the second surface is angled at a zero degrees with respect to the basepan first surface.

15. The engaging lock according to claim 12, further comprising a support stand.

16. A method to secure an electrical component to a basepan, the method comprising,
mounting the electrical component to a basepan first surface;
providing a top down fastening assembly having a self aligning support post and an engaging lock; and
securing the electrical component with the top down fastening assembly.

17. The method of claim 16, wherein the self aligning support post includes a plurality of non zero angled faces to facilitate assembly of the electrical components.

18. The method of claim 16, wherein the self aligning support post includes an interior cavity to house the engaging lock.

19. The method of claim 16, wherein the engaging lock comprises at least a first and a second surface both inclined at a non zero angle with respect to the first surface of the basepan.

20. A load center comprising: an enclosure, a basepan mounted with the enclosure for distributing a load to a circuit breaker, a basepan first surface for securing electrical components with a top down fastener assembly wherein the top down fastener assembly comprising an angled arm and a swing snap for securing the at least one electrical component to a basepan first surface.

21. The load center according to claim 20, wherein the arm is shaped as a rectangle, square, or cylinder.

22. The load center according to claim 20, wherein the swing snap is affixed to a wall.

23. The load center according to claim 20, wherein a first surface of the arm is inclined at a non-zero angle with respect to the first surface of the basepan.

24. The load center according to claim 20, wherein the first surface of the swing snap is inclined at a non-zero degree angle with respect to the first surface of the basepan.

* * * * *